(12) United States Patent
Nolan

(10) Patent No.: US 6,860,596 B1
(45) Date of Patent: Mar. 1, 2005

(54) FLOATATION DEVICE FOR EYEGLASSES

(76) Inventor: Vicki S. Nolan, 109 Iron Lake Ct., St. Charles, MO (US) 63304-7277

( * ) Notice: Subject to any disclaimer, the term of this patent is extended or adjusted under 35 U.S.C. 154(b) by 0 days.

(21) Appl. No.: 10/686,146

(22) Filed: Oct. 15, 2003

(51) Int. Cl.$^7$ ................................................. G02C 1/00
(52) U.S. Cl. ......................................... 351/43; 351/158
(58) Field of Search .................................. 351/43, 158

(56) References Cited

U.S. PATENT DOCUMENTS

| | | | |
|---|---|---|---|
| 3,016,796 A | 1/1962 | Boothe | 351/43 |
| 3,038,375 A | 6/1962 | Gansz | 351/43 |
| 3,390,938 A | 7/1968 | Gansz | 351/43 |
| 3,711,190 A | 1/1973 | Blair | 351/43 |
| 4,966,451 A | 10/1990 | Corral et al. | 351/43 |
| D327,726 S | 7/1992 | Lowrance et al. | D22/139 |
| 5,235,355 A | 8/1993 | May | 351/123 |
| D342,081 S | 12/1993 | Fynan | D16/123 |

FOREIGN PATENT DOCUMENTS

FR        2605421     *  4/1988   ............... 351/43

* cited by examiner

*Primary Examiner*—Huy Mai
(74) *Attorney, Agent, or Firm*—Grace J. Fishel

(57) ABSTRACT

A floatation device for attachment to the temples of a pair of eyeglasses in a manner that the device is comfortable to wear. A longitudinal passage in the body of the device grips a straight portion of the temples of the eyeglasses in a manner that no external retention means are required. The passage is substantially off centerline of the body with a minor portion of the body on an inboard side of the temples and a major portion of the body on an outboard side of the temples. The body may be colored for high visibility in the water.

10 Claims, 1 Drawing Sheet

FLOATATION DEVICE FOR EYEGLASSES

BACKGROUND OF THE INVENTION

1. Field of the Invention

The present invention relates to a floatation device for attachment to the temples of a pair of glasses in a manner that the device is comfortable to wear and cannot be knocked loose.

2. Brief Description of the Prior Art

Many kinds of floats have been proposed for attachment to eyeglasses such that they will float if they fall into the water during water related activities such as swimming, diving, water skiing, sailing and fishing. While the idea of attaching something buoyant is an intuitive solution, practical application has eluded inventors. Ideally, a float for a pair of eyeglasses would be inexpensive to make, easily mounted on the eyeglasses in a manner that it cannot be dislodged and comfortable to wear without pressing into the cheek of a wearer or becoming entangled in the wearer's hair.

U.S. Pat. No. 3,711,190 to Blair describes an air-filled bladder that is attached with a pair of loops to an outboard side of the temples. The bladder extends along the length of the straight portion of the temple to the curved ear portion. The loop near the curved ear portion presses into the cheek and catches the wearer's hair. The product is also relatively expensive to make. U.S. Pat. No. 3,390,938 to Gansz describes an earlier hollow float which, like the float in Blair, extends the length of the straight portion of the temple and is expensive to make.

U.S. Pat. No. 3,038,375 to Gansz and U.S. Pat. No. 3,016,796 to Boothe describe pontoon-style floats for attachment to the outboard side of the temple. For each style float, there is an attachment loop that presses into the cheek or catches the wearer's hair.

U.S. Pat. No. 4,966,451 to Corral et al. describes a float that is formed of flexible, low-density foam and one of which is attached to each temple of eyeglasses with a T-slot. A first slit of the T-slot extends from the inboard side of the temple and meets a second longitudinal slot that runs the length of the float. A pair of elastic bands are threaded over the end of the curved ear portion and passed around the float to keep the slits closed and the float attached to the temple such that it cannot be knocked off when a user dives into water, falls off a water ski or the like. An add-on pad for greater buoyancy may be attached to the float on the outboard side of the temple.

BRIEF SUMMARY OF THE INVENTION

In view of the above, it is an object of-the present invention to provide an inexpensive, preferably disposable floatation device for attachment to eyeglasses. It is another object to provide a floatation device that is comfortable to wear, does not interfere with the wearer's vision and does not catch in his or her hair. Other objects and features of the invention will be in part apparent and in part pointed out hereinafter.

In accordance with the invention, a floatation device for eyeglasses having temples with a straight portion and a curved ear portion is described. The device has a body formed of a resilient, soft floatation material with a longitudinal passage through which the temple can be threaded for resiliently gripping the straight portion of the temple. The passageway is substantially off centerline of the body whereby a minor portion of the body is on an inboard side of the temple and a major portion of the body is on an outboard side of the temple. Once threaded on the temples, the device will not be dislodged from the eyeglasses and will cause them to float if they fall into-the water. The device is simple to use and sufficiently inexpensive to be disposable.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1:
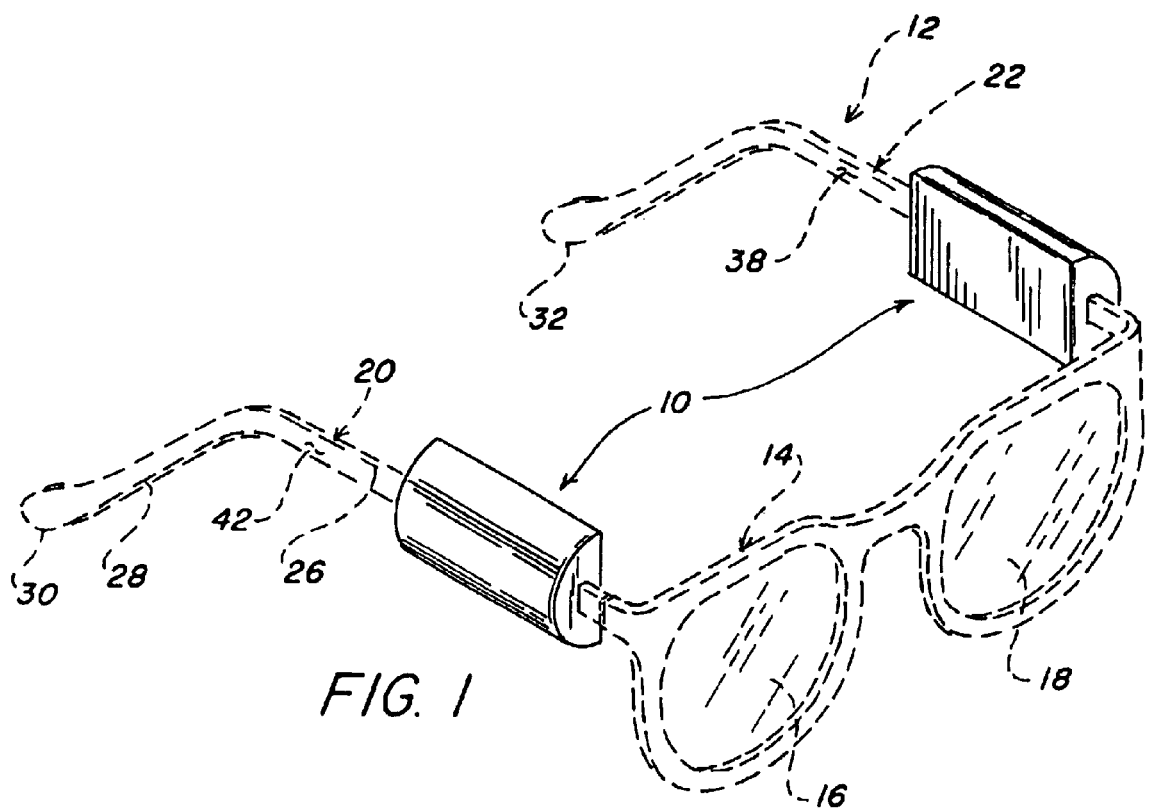
FIG. 1 is a perspective view of a pair of floatation devices in accordance with the present invention on a pair of eyeglasses.

Referring to the drawings more particularly by reference character, reference numeral 10 refers to a floatation device in accordance with the present invention. Device 10 is for use on a pair of eyeglasses 12 including a frame 14 in which a pair of lenses 16, 18 are mounted as shown in FIG. 1. A pair of temples 20, 22 are pivotally connected to frame 14. The term eyeglasses as used herein includes prescription glasses to correct vision as well as sunglasses (prescription or otherwise) to protect the eyes using polarized or colored lenses.

Device 10 includes a body 24 formed of a resilient, soft floatation material. A suitable material for this purpose is a flexible, low-density, closed cell foam. Closed cell foams are extremely buoyant because the sealed chambers do not absorb water. Polyethylene and ethyl vinyl acetate flexible, low-density, closed cell foams are formed by blowing gasses into the molten plastic material. In general, softer, less dense foams have more floatation, while firmer, denser foams are more durable. For the present purpose, soft, highly buoyant material is preferred.

Figure 3:
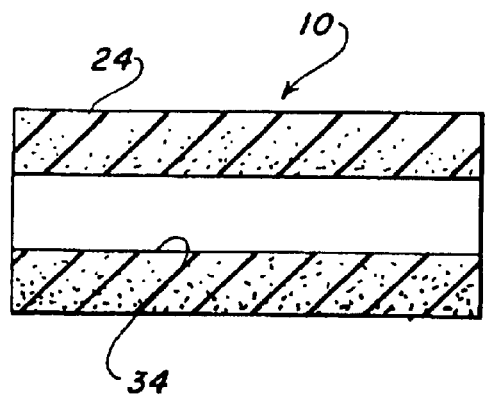
FIG. 3 is a sectional view taken along the plane of 3—3 in FIG. 2.

With continuing reference to FIG. 1, temples 20, 22 of eyeglasses 12 have a straight portion 26 and a curved ear portion 28. Free ends 30, 32 of temples 20, 22 are usually wider than the balance of curved ear portion 28. Body 24 is elongated with a longitudinal passage 34, seen in FIG. 3, through which temples 20, 22 can be threaded such that device 10.is seated on straight portion 26, preferably generally midway between where temples 20, 22 are hinged to frame 14 and curved ear portion 28. The inside diameter of longitudinal passage 34 may be less than the diameter of straight portions 26 such that body 24 is stretched as it is threaded over the free ends 30, 32 and resiliently grips straight portion 26. No external retention means are required.

Figure 2:
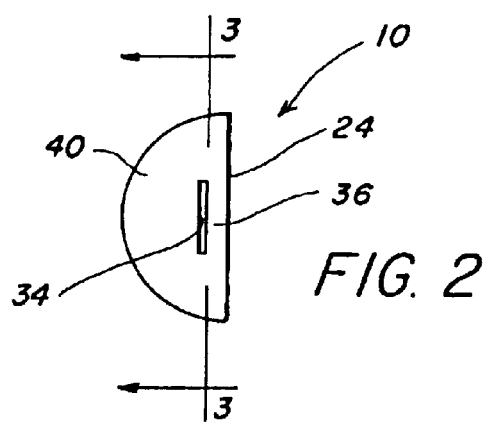
FIG. 2 is an enlarged end view of the floatation device.

As best seen in FIG. 2, longitudinal passage 34 in body 24 is substantially off centerline with a minor portion 36 of the body on an inboard side 38 of temples 20, 22 and a major portion 40 of the body is on an outboard side 42 of temples 20, 22. In the drawings, body 24 is positioned on straight portion 26 of temples 20, 22 about ½ to ¾ inch from frame 14. Body 24 is about 1 to 1¾ inches long and about ⅕ to ¾ inch wide. A typical ratio of minor portion 36 to major portion 40 is from about 1:2 to about 1:3 or greater. With continuing reference to FIG. 2, body 24 is generally half-cylindrical but could take other geometric shapes. Body 24 may also be made of foam colored a bright color such as orange, green, yellow, etc. so that device 10 is visible in the water from a distance.

In use, ordinarily two devices 10 are used, one for each of temples 20, 22. Each device 10 is threaded over one of free ends 30, 32 of temples 20, 22 and slid along the temple until seated on straight portion 26 preferably about ½ to ¾ inch from frame 14. In this position, body 24 is substantially out of the peripheral vision of the wearer. Narrow minor portion 36 of body 24, if in contact with the wearer's cheek, exerts little pressure as the material out of which it is made is very soft. Body 24 grips straight portion 26 firmly as longitudinal passage 34 is preferably stretched. Even a sudden wave of water will not dislodge device 10 should the wearer fall into the water or be struck by a wave. Pair of devices 10 will cause eyeglasses 12 to float if they fall into the water. Devices 10 will not lose buoyancy for an appreciable period of time as the closed-cell foam will not waterlog.

When the wearer wants to remove devices 10 from eyeglasses 12, they may tear as the foam is very soft. This is not a problem, however, as device 10 is inexpensive to make and may be regarded as a one-use, disposable item.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A floatation device for eyeglasses having temples with a straight portion and a curved ear portion, said device having a body formed of a resilient, soft floatation material, said body having a longitudinal passage through which the temple can be threaded for resiliently gripping the straight portion of the temple, said passageway being substantially off centerline of the body whereby a minor portion of the body is on an inboard side of the temple and a major portion of the body is on an outboard side of the temple.

2. The device of claim 1 wherein the body is about 1 to 1¾ inches long and about ⅕ to ¾ inch wide.

3. The device of claim 1 wherein the passageway is narrower than the straight portion of the temples.

4. A floatation device for eyeglasses having temples with a straight portion and a curved ear portion, said device having a body formed of a flexible, low-density, closed-cell foam, said body having a longitudinal passage through which the temple can be threaded for resiliently gripping the straight portion of the temple, said passageway being substantially off centerline of the body whereby a minor portion of the body is on an inboard side of the temple and a major portion of the body is on an outboard side of the temple, said passageway being narrower than the straight portion of the temples so that no external retention means are required.

5. The floatation device of claim 4 wherein the foam is polyethylene.

6. The floatation device of claim 4 wherein the foam is ethyl vinyl acetate.

7. The floatation device of claim 4 wherein the foam is colored so that the device is visible in the water from a distance.

8. The floatation device of claim 4 wherein the body is about 1 to 1¾ inches long and about ⅕ to ¾ inch wide.

9. The floatation device of claim 4 wherein the ratio of the width of the minor portion to the major portion is greater than 1:2.

10. The floatation device of claim 4 wherein the ratio of the width of the minor portion to the major portion is between about 1:2 and 1:3.

\* \* \* \* \*